No. 772,550. PATENTED OCT. 18, 1904.
H. L. ZEIGLER.
PUNCHING MACHINE.
APPLICATION FILED DEC. 11, 1903.
NO MODEL. 11 SHEETS—SHEET 1.

Fig. 1.

Witnesses:
Chas. E. Gaylord.
Geo. E. Larson.

Inventor:
H. L. Zeigler,
By L. B. Coupland
Atty.

No. 772,550. PATENTED OCT. 18, 1904.
H. L. ZEIGLER.
PUNCHING MACHINE.
APPLICATION FILED DEC. 11, 1903.
NO MODEL. 11 SHEETS—SHEET 2.

No. 772,550. PATENTED OCT. 18, 1904.
H. L. ZEIGLER.
PUNCHING MACHINE.
APPLICATION FILED DEC. 11, 1903.
NO MODEL. 11 SHEETS—SHEET 8.

Witnesses:
Inventor,
H. L. Zeigler,
By L. B. Coupland.
Atty.

No. 772,550. PATENTED OCT. 18, 1904.
H. L. ZEIGLER.
PUNCHING MACHINE.
APPLICATION FILED DEC. 11, 1903.
NO MODEL. 11 SHEETS—SHEET 9.

No. 772,550. PATENTED OCT. 18, 1904.
H. L. ZEIGLER.
PUNCHING MACHINE.
APPLICATION FILED DEC. 11, 1903.

NO MODEL. 11 SHEETS—SHEET 11.

Witnesses:
Inventor:
H. L. Zeigler,
By L. B. Coupland
Atty.

No. 772,550. Patented October 18, 1904.

UNITED STATES PATENT OFFICE.

HARRY L. ZEIGLER, OF CHICAGO, ILLINOIS, ASSIGNOR OF ONE-FOURTH TO JOHN HUMPHREY, OF CHICAGO, ILLINOIS.

PUNCHING-MACHINE.

SPECIFICATION forming part of Letters Patent No. 772,550, dated October 18, 1904.

Application filed December 11, 1903. Serial No. 184,737. (No model.)

*To all whom it may concern:*

Be it known that I, HARRY L. ZEIGLER, a citizen of the United States, residing at Chicago, in the county of Cook and State of Illinois, have invented new and useful Improvements in Punching-Machines, of which the following is a specification.

This invention relates to improvements in gang punching-machines in which a pattern or templet is used in automatically actuating the punches in accordance with the number of perforations to be produced in the work and the location of the same, as provided for in the particular pattern used.

The object is to provide a machine of this character in which a series of punches or plungers are operatively mounted, each punch being adapted to have an independent individual action, and is intended generally for punching rivet and bolt holes in sheet metal and metal plates, and especially in the manufacture of steel ranges and other work in which the perforations are regularly or irregularly disposed.

In the accompanying drawings, Fig. 2 is an elevation of the opposite side from that presented in Fig. 1, both Figs. 1 and 2 being viewed in the direction indicated by the arrows 1 and 2 shown at the left in Fig. 4. Fig. 2ª is a sectional elevation on line 2ª of Figs. 6 and 9, illustrating a pawl-and-ratchet detail.

A represents the different parts of the main frame supporting the working mechanism. If necessary, other reference characters will be used on minor parts of the frame in clearly locating certain mechanical features.

Figure 4:
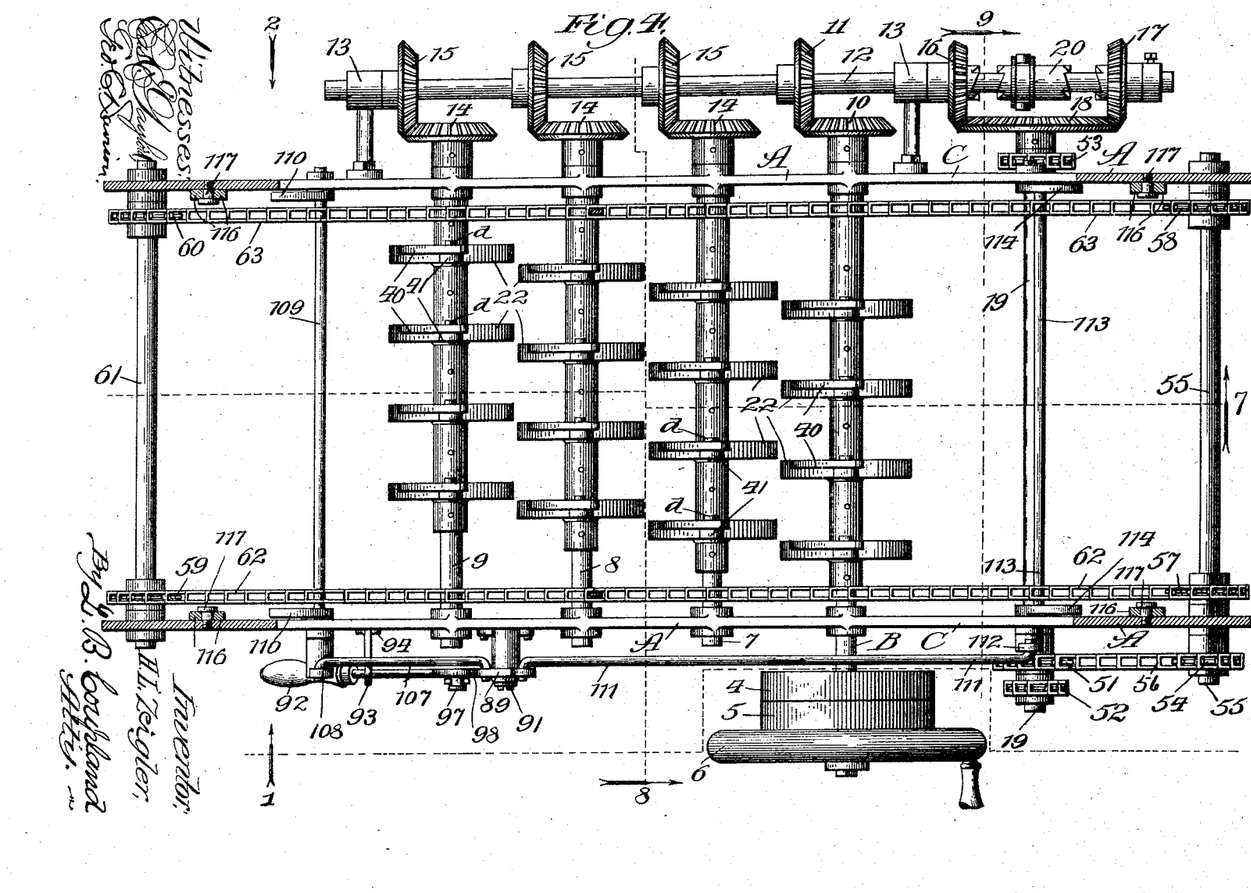
Fig. 4 is a plan section on line 4, Figs. 1 and 7, looking in the direction indicated by the arrow.
Figure 5:
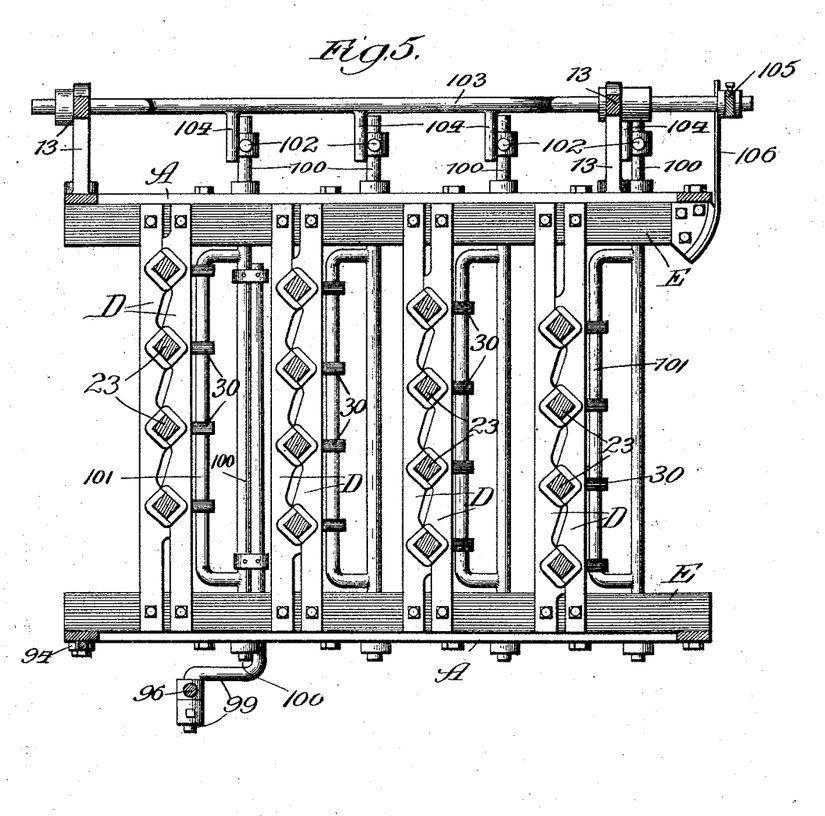
Fig. 5 is a plan section on line 5, Figs. 1 and 7.
Figure 6:
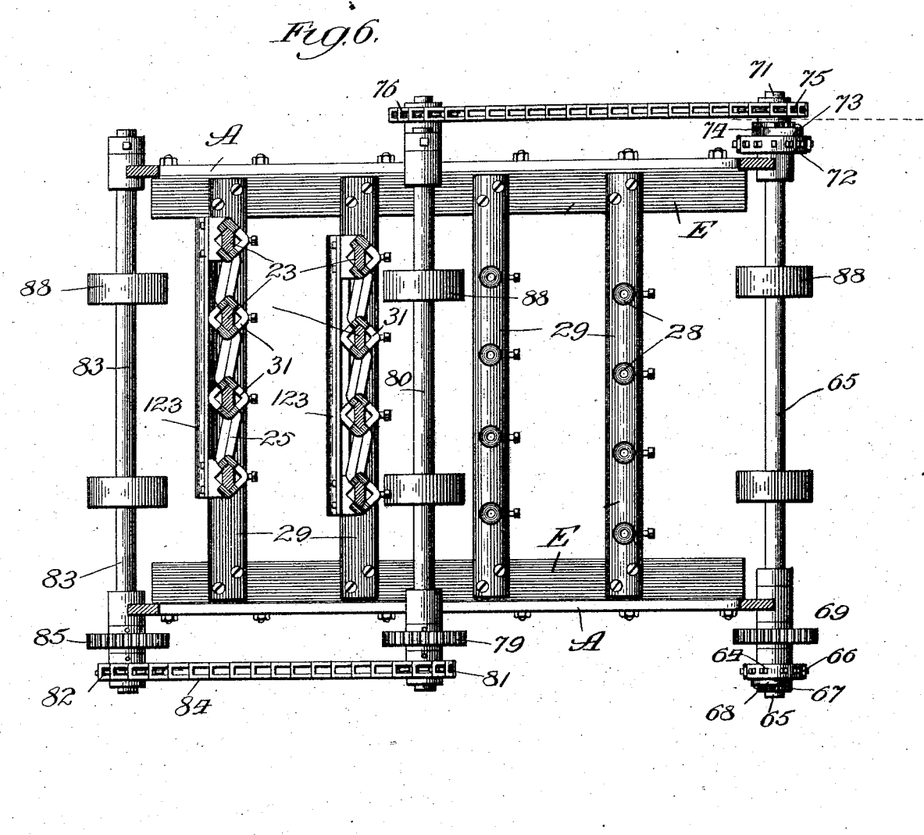
Fig. 6 is a plan section on angular line 6, Figs. 1 and 7.
Figure 8:
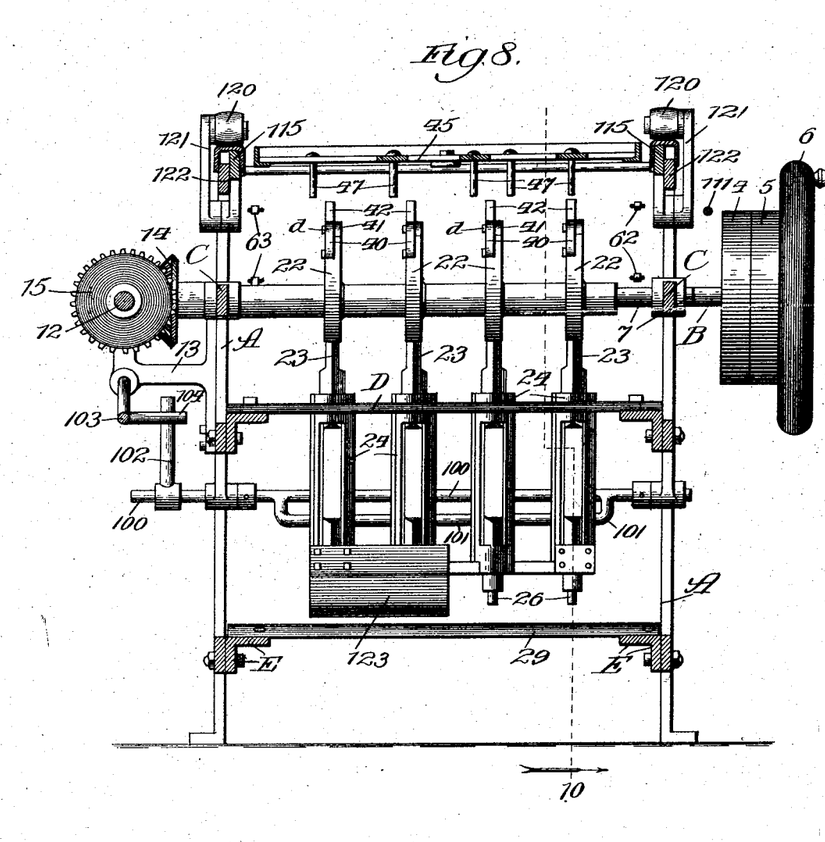
Fig. 8 is a vertical transverse section on line 8, Figs. 1 and 4.

The machine driving-shaft B is journaled in the companion longitudinal side bars C of the upper part of the frame and has the usual power band-pulleys 4 and 5 mounted on the end projecting from the front side of the machine, as shown in Figs. 4 and 8. The hand crank-wheel 6 is mounted on the same shaft and is used as a matter of convenience in manually operating the machine when necessary in setting or adjusting some of the parts. The relative positions of the band-pulleys and crank-wheel are also indicated by dotted circular lines in Fig. 1. A number of revoluble punch-carrying shafts 7, 8, and 9 are provided with suitable journal-bearings in the frame in line with driving-shaft B, which also has a series of punches mounted thereon. A pinion 10 is mounted on the rear end of the driving-shaft, Figs. 2 and 4, and which in turn engages a pinion 11, mounted on a counter-shaft 12, located at the rear side of the machine and running longitudinally therewith and at right angles to the driving-shaft and other punch-carrying shafts. The shaft 12 is journaled in companion brackets 13, bolted to the main frame. Each of the punch-carrying shafts independent from the combined driving and punch-carrying shaft B has a pinion 14 mounted on the rear end thereof and each of which in turn engages one of a corresponding number of pinions 15, mounted on shaft 12. All pinions and gear-wheels are rigidly mounted in their working position unless it is otherwise stated.

The companion clutch-pinions 16 and 17 are loosely mounted on shaft 12. These pinions are set some distance apart and are engaged by an intermediate gear-wheel 18, Figs. 2 and 4, mounted on a transverse shaft 19, provided with suitable journal-bearings in the front end of the frame.

A clutch-sleeve 20 is feathered on shaft 12 and is located between the pinions 16 and 17. This sleeve has the usual rotary movement with its carrying-shaft and also endwise movement in engaging either one of the clutch-pinions or the other, as may be required. The means employed for actuating the clutch-sleeve will be hereinafter referred to.

The construction and operation of the punching mechanism will be described next.

A number of cam-wheels 21 are eccentrically and loosely mounted on the driving-shaft B and the series of punch-carrying shafts 7, 8, and 9. An eccentric yoke 22 loosely surrounds each of the cam-wheels (best shown in Fig. 7) and is rigidly mounted on the upper end of the punch-stocks 23, which have a vertical movement in the guide-sleeves 24, the upper ends of which are fixed in the transverse frame-bars D and the lower ends being supported in transverse bars 25, bolted to the frame, Figs. 5, 6, 7, 10, 11, and 12. Four punches are mounted on each of the four shafts; but it is obvious that a greater or less number may be used, in accordance with the capacity required in any particular machine. It will also be understood that the description of one punch mechanism will apply to all, the same reference characters being used on like parts.

A punch 26 is inserted in the lower end of the stocks 23 and is removably secured therein by a set-screw 27. The female die members 28, Figs. 6, 10, 11, and 12, are removably secured in the die-bars 29, supported on the frame-bars E. A shifting-finger 30 is mounted on the punch-stocks and projects therefrom through a vertical slot-opening 31 in the guide-sleeves 24.

Figure 10:
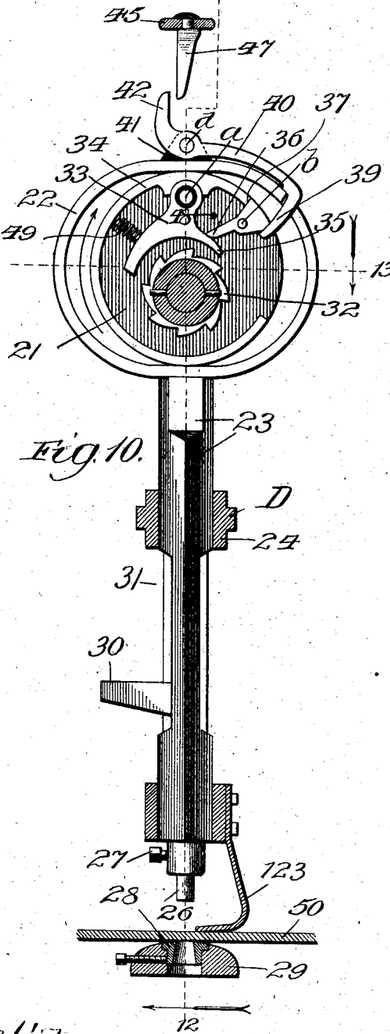
Fig. 10 is an enlarged sectional elevation of one of the punch-plungers and its actuating mechanism, taken on line 10 of Figs. 8 and 12, showing the punch in its raised or normal position.
Figure 11:
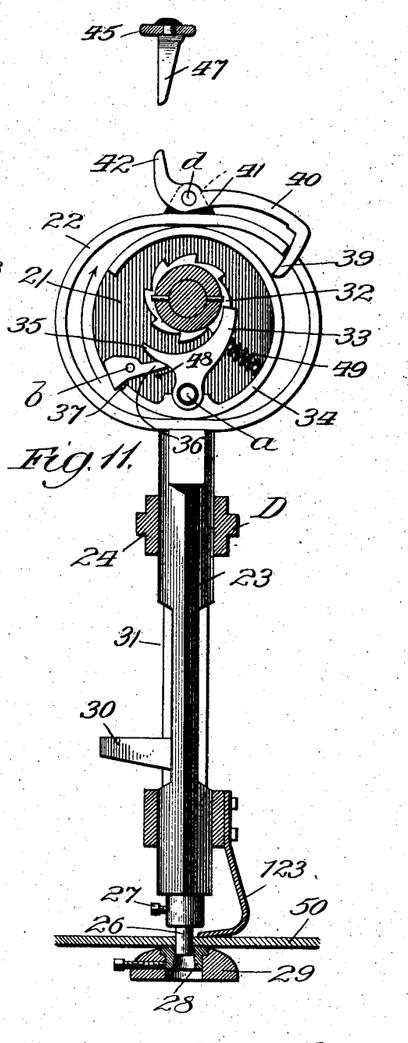
Fig. 11 is a similar view as that of Fig. 10 with the difference that the punch is shown in its lowest position and in engagement with the work and die member.

A ratchet-wheel 32, Figs. 10 and 11, is used in connection with each of the series of cam-wheels 21. These ratchet-wheels are rigidly mounted on the driving-shaft B and the shafts 7, 8, and 9 and are set up close to the cam-wheels, on one side thereof and in position to be engaged by a spring-pressed pawl 32, pivoted, as at $a$, to the overhanging rim edge 34 of the respective cam-wheels. The pawl 33 is provided with a spur 35 projecting into position to be contacted by the inner end of a finger 36 in locking pawl 33 in its normal disengaged position. (Shown in Fig. 10.) This finger is pivoted to the cam-wheels, as at $b$, the outer heavier end stopping against a shoulder 37 when in the locking position. The shoulder 37 is formed by cutting out a segmental portion of rim edge 34 of cams 21, the outer end of finger 36 being held against this shoulder by the inturned hook end 39 of a dog 40. This dog is pivoted, as at $d$, to a lug 41, formed on the yoke 22, and terminates in the upturned end 42. In the position shown in Fig. 10 the punch is in its highest normal position.

Figure 3:
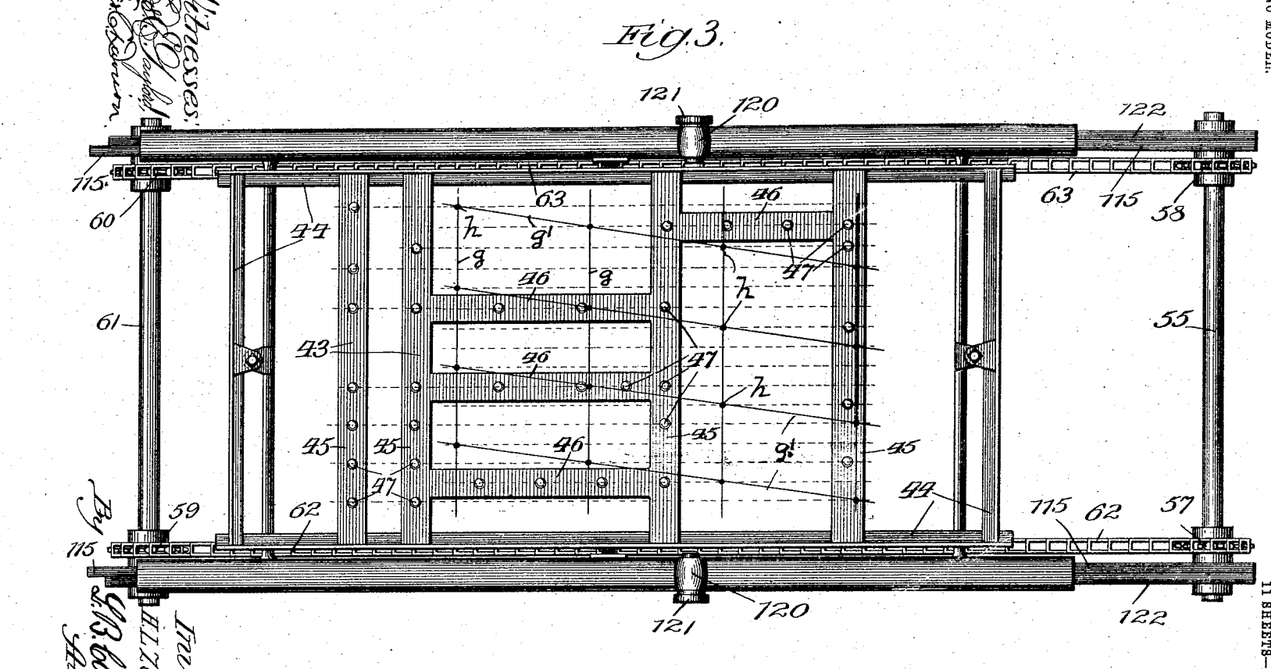
Fig. 3 is a plan showing a punching-pattern or templet and its supporting-carriage resting on the top of the machine-frame.
Figure 7:
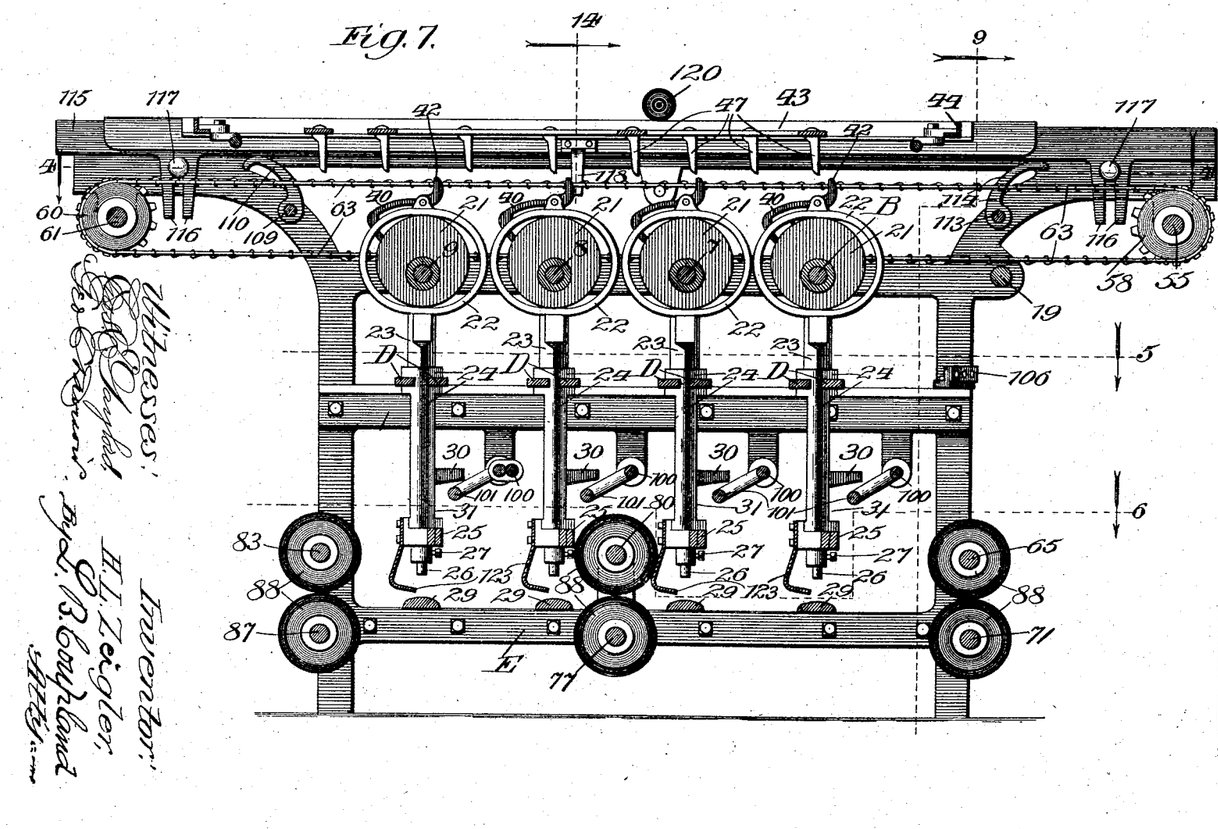
Fig. 7 is a vertical longitudinal section on line 7, Fig. 4.

A punching-pattern or templet 43, Figs. 3 and 7, is secured in a traveling carriage 44, mounted on top of the main frame. This pattern consists of a number of transverse bars 45 and the longitudinal connecting-bars 46, which may have a regular or irregular formation, in accordance with the nature of the work—that is, the number and location of the holes to be punched out. A number of punch-tripping pins 47 are rigidly inserted in and project downward from the under side of the pattern in position to contact the upper end 42 of dog 40 as it moves forward. This contact of the pins 47 carried by the pattern has the effect of rocking the dog 40 on its pivot and releasing the inner end 39 thereof from its engagement with finger 36. In Fig. 10 one of the tripping-pins 47 is shown in position just before contact, all the parts of the punch-actuating mechanism being in their normal position. In Fig. 11 the pin 47 has moved on out of contact and the different parts are in their abnormal position. The operation of bringing about this change in position is as follows: When the inner end 39 of dog 40 is released from its locking engagement, Fig. 10, with the outer end of finger 36, the latter will drop away from shoulder 37 and bring the inner end up against a stop-pin 48 and release the pawl 33 from its normally locked position and which is thrown into engagement with ratchet-wheel 32 by means of a spring 49 and causes the cam-wheel 21 to turn with its shaft and bring the high side thereof in contact with the inside bottom of yoke 22, and thereby impart a downward movement to the punch-stock and force the punch through the sheet of metal or work 50, as shown in Fig. 11. During the rotary movement of the cam wheel or wheels 21 the inner end of dog 40 rides on the exterior rim edge 34 until the cam rolls around far enough to bring the cut-out edge into position on the normal side, when the inner hook end of dog 40 will drop into the innermost position and at the proper time reengage finger 36 and force the outer end up against shoulder 37 and the inner end into position against the spur end 35 of the pawl 33 and force the same out of engagement with ratchet-wheel 32 against the pressure of spring 49. It will be understood that the high part of the cam-wheels coming in contact with the upper inner side of the yoke or yokes 22 raises the punches to their normal position, the cam-wheels coming to a full stop after each revolution and remain at rest until again actuated by a pattern-tripping finger moving in the path of dog 40.

The pattern 43, Fig. 3, is removably retained in place, so that one can be replaced by another in accordance with the number and particular location of the holes, so that any number of patterns may be used in connection with each machine. The view in Fig. 3 is in part diagrammatical in showing the relative position of the pattern and punches. The lines $g$ show the punches to be in a straight line transversely; but longitudinally they are set on diagonal lines $g'$, the black dots $h$ indicating the position of the punches. Thus on the forward movement of the pattern one or more of the tripping-pins 47 may contact and actuate the punching mechanism, so that only a certain number of the punches are actuated on each forward movement of the pattern and the holes located in the work accordingly.

The transverse shaft 19 carries three sprockets 51, 52, and 53. The sprocket 51 is mounted on the end projecting from the front side of the machine and is connected with a sprocket 54, mounted on a transverse shaft 55, journaled in the extreme front end of the machine, by a chain belt 56. The sprockets 57 and 58 are mounted on shaft 55, adjacent to each end thereof, as shown in Fig. 4. The companion sprocket-wheels 59 and 60 are mounted on a shaft 61, journaled in the frame at the rear end of the machine, and connect with sprockets 57 and 58 by chain belts 62 and 63, by which means the necessary forward-and-back movement of the pattern-carriage is provided for.

The sprocket 52 on shaft 19 is in line with a sprocket 64, loosely mounted on the upper feed-shaft 65, and is connected therewith by a chain belt 66. A ratchet-wheel 67 (front side of machine, Fig. 1) is rigidly mounted on feed-shaft 65, adjacent to loose sprocket 64, which carries a pawl 68, positioned to engage ratchet 67 and cause the upper feed-shaft to rotate on the forward movement. A pinion 69 is also mounted on the front end of shaft 65 and engages a pinion 70 on the corresponding front end of lower feed-shaft 71 in transmitting the necessary forward motion thereto. A sprocket 72 is loosely mounted on the rear end of the lower feed-shaft 71, Fig. 2 and Fig. 2ª, and carries a pawl 73, positioned to engage a ratchet-wheel 74, mounted on the lower feed-shaft, and continues the required forward movement of the feed-rolls when the pattern-carriage is reversed for the return movement. On the forward movement sprocket 64 and ratchet 67 are in operation, sprocket 72 on opposite side being idle. When the forward movement is completed and the motion reversed, ratchet 67 is thrown out of action and sprocket 72 and ratchet 74 become engaged and rotate the feed-rolls and complete the operation of discharging the work from the machine before the forward movement begins again.

The means employed for transmitting motion to the feed-shafts located in the middle and rear end of the machine will be next described.

A sprocket 75 is mounted on the rear end of lower feed-shaft 71 and is connected with a sprocket 76 by a belt 76', mounted on the rear end of lower middle feed-shaft 77, which also carries a pinion 78 on the front side engaging a pinion 79, mounted on the front end of the upper feed-shaft 80. A sprocket 81 is mounted on the front end of the upper middle feed-shaft 80 and is connected to a sprocket 82, mounted on the front end of upper rear feed-shaft 83 by a belt 84. A pinion 85 is mounted on the front end of feed-shaft 83 and engages a companion pinion 86, mounted on the lower feed-shaft 87, in transmitting the required motion. The feed-rolls on the different feed-shafts have frictional contact with and move the work during the operation of the machine.

Figure 1:
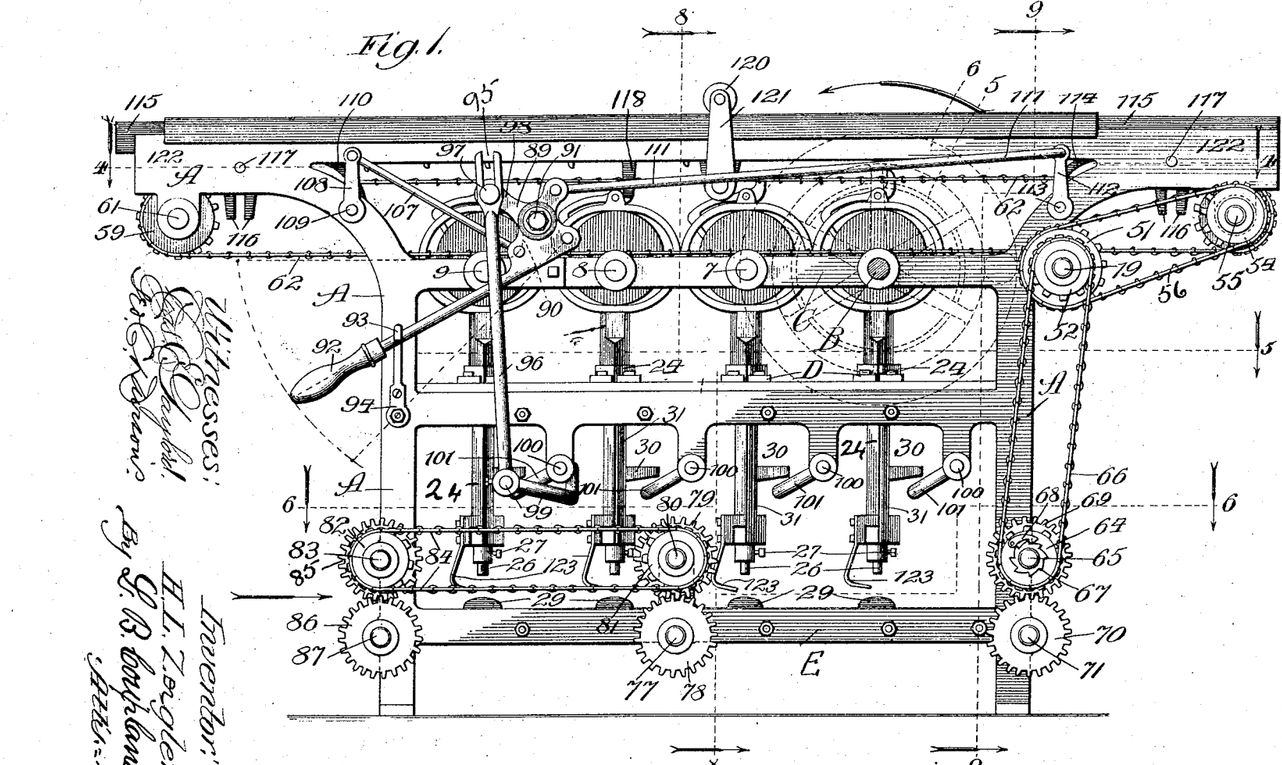
Figure 1 is an elevation showing the front or operating side of the machine.
Figures 2, 2A:
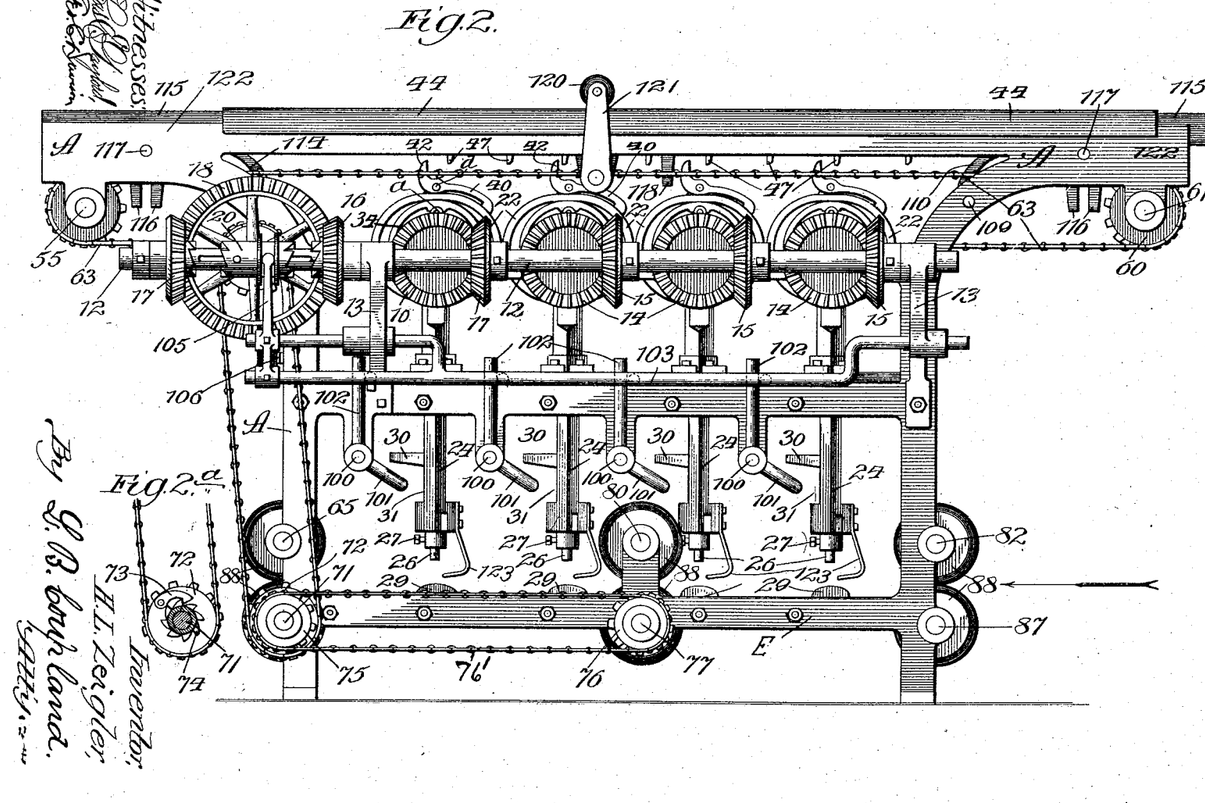
Figure 9:
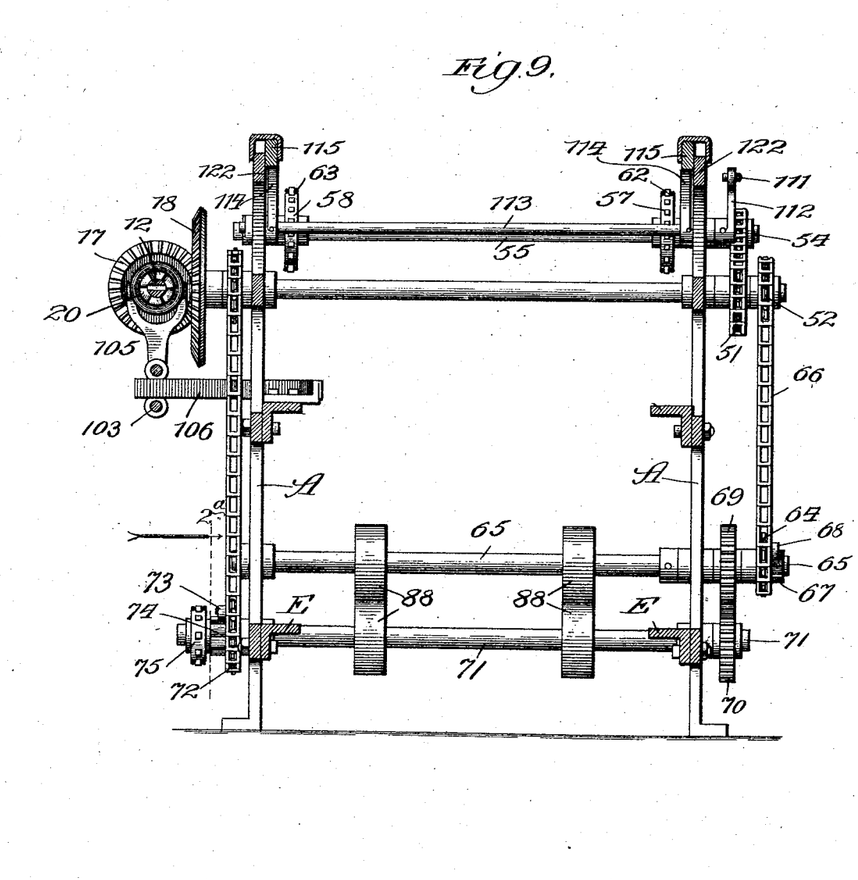
Fig. 9 is a vertical transverse section on line 9, Figs. 1, 4, and 7.

A crank-plate 89, Fig. 1, is supported from a bracket 90 and has a turning movement on a pin 91. The inner end of a hand-lever 92 is attached to the crank-plate and has three different positions in practical working. Its normal or middle position, Fig. 1, corresponds to the out-of-engagement position of the clutch-sleeve 20, as shown in Fig. 2. The lever 92 is held in this position by a hook 93, formed on a plate 94 and bolted to the frame. The upper bifurcated end 95 of a rod 96, Fig. 1, loosely engages a pin 97, fixed in an arm 98 of crank 89. The lower end of rod 96 connects with a horizontal crank-rod 99, running transversely and rigidly secured to the first of a number of transverse rock-shafts 100. A rock-shaft is employed for each transverse row of punches and are indicated by the same reference-numeral, as shown in Figs. 1, 2, 5, and 7. The rock-shafts 100 are each provided with a bow cam part 101, positioned just in front of each row of punches. Each of the rock-shafts is provided with a standard 102, the lower end of which is secured to the rear end of the shaft, the free end extending upward and just above the line of the horizontal clutch shifting-rod 103 and in advance of contacting pins 104, formed on the rod 103. The clutch shifting-rod has a free endwise movement and is supported in brackets 13, in which counter-shaft 12 is journaled. The lower end of a clutch-arm 105 is mounted on the bifurcated forward end of the shifting-rod 103, the upper free end being in engagement with the clutch-sleeve 20, Figs. 2 and 9. One end of a spring 106 is rigidly secured to the frame, Fig. 9, the free end passing between the bifurcated ends of the clutch shifting-rod and bearing against the inner side of the clutch-arm 105.

The shifting-fingers 30 on the respective punch-stocks project over the cam parts 101 of the rock-shafts 100 and in position to have a frictional contact with the same on the down movement. The object of this arrangement is to provide means for automatically and periodically throwing the clutch-sleeve 20 out of engagement on the forward movement in stopping the work each time that one or more of the punches enters the same. The down movement of the punch-stocks and the depressing action of the fingers 30 on the cam parts 101 has the effect of rocking the shafts 100 and causes the standards 102 to press against pins 104, and thereby impart an endwise movement to clutch-rod 103 and retracts the clutch-sleeve from its forward engaged position against the pressure of the leaf-spring 106 and momentarily arrests the forward movement of the feed-shafts until the work has been perforated and the punches withdrawn. When the pressure of fingers 30 is released, the spring 106 throws the clutch-sleeve into engagement again with clutch-pinion 17 and the forward movement continued, and so on intermittently until all the holes indicated by the pattern have been punched out.

The mechansim employed for returning the pattern and its carriage to their normal position after the forward movement has been completed will be described next.

One end of a rod 107, Fig. 1, is connected to the crank-plate 90 and the other end connected to the upper end of a link 108. The lower end of this link is mounted on a transverse rock-shaft 109, Figs. 1, 2, and 7, which in turn carries companion curved lifting-arms 110, located at opposite sides of the machine. One end of a rod 111 is connected to the crank-plate 90, the other end being connected to the upper end of a link 112, mounted on a transverse rock-shaft 113, located in the front end of the machine, Figs. 1 and 7.

Figures 12, 13, 14, 15:
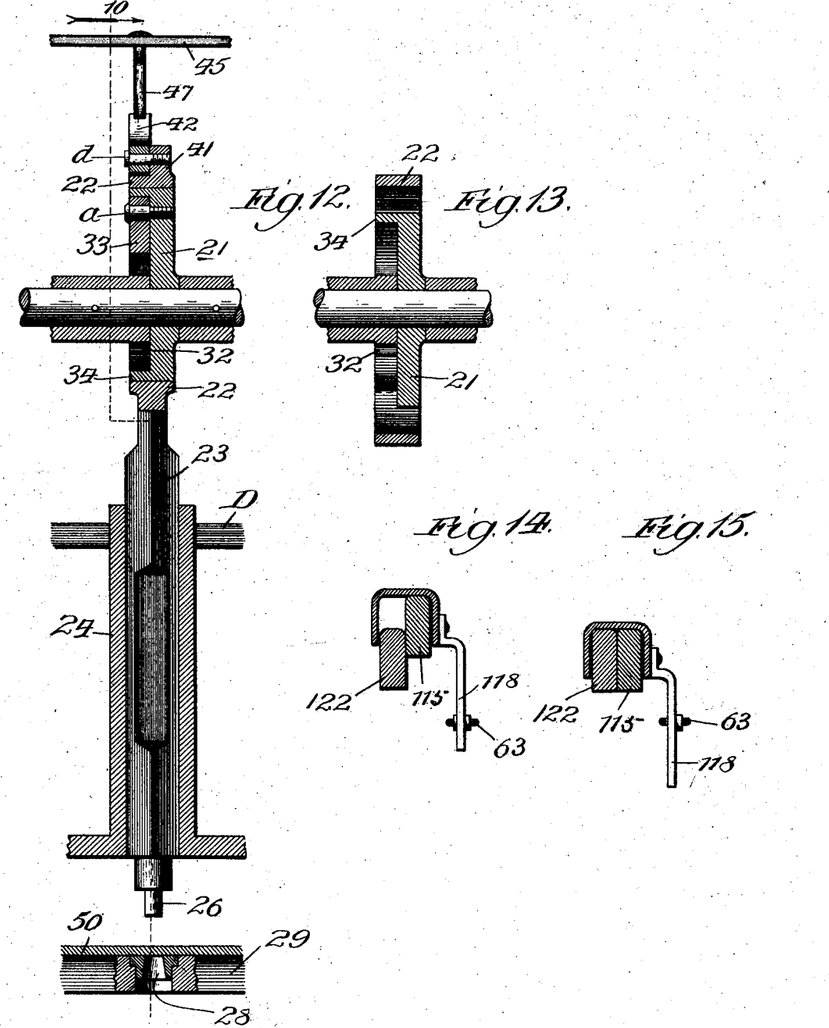
Fig. 12 is a vertical sectional elevation on line 12, Fig. 10.
Fig. 13 is a transverse section on line 13, Fig. 10.
Fig. 14 is a transverse section through the pattern-carriage, showing the same in its raised position.
Fig. 15 is a similar view showing the carriage in its normal position.

The companion curved lifting-arms 114 are mounted on shaft 113 at opposite sides and in line with like arms located in the rear end of the machine. The four curved arms bear against the under side of and adjacent to the respective ends of the inside longitudinal companion guide-bars 115, on which the pattern-carriage 44 is loosely mounted, Figs. 14 and 15, showing transverse sections of these parts on the rear side of the machine. The guide-bars 115 are provided near each end with downwardly-projecting bifurcated lugs 116, which straddle pins 117, rigidly secured in the top frame-bars 122. This provides for the vertical adjustment of the bars 115 and prevents a longitudinal movement thereof. The upper ends of companion fingers 118, Figs. 1, 2, 3, and 7, are secured to the opposite sides of the pattern-carriage, the lower free ends engaging chain belts 62 and 63 in imparting a reciprocating movement to the carriage. The companion rollers 120 are journaled in brackets 121 and have a bearing on the pattern-carriage and retain the same in its proper working position on the frame.

The strippers 123 are secured along their upper edge to the guide-sleeves 24, the lower free edges curving inward in position to contact and prevent the work from adhering to and following the up movement of the punches.

In practical working the hand-lever 92 has three different positions. The locked middle position in Fig. 1 corresponds to the disengaged position of the clutch-sleeve 20 in Fig. 2. In this position the pattern-carriage and feed mechanism are at rest, the punch-carrying shafts being in motion all the time that the machine is being operated. Raising the lever 92 to its highest or second position throws the clutch-sleeve into engagement for the forward movement, motion being transmitted to the pattern-carriage and feed-shaft and the punches automatically actuated by the contact of the tripping-fingers carried by the pattern, the forward movement being automatically and momentarily suspended during the time that one or more of the punches are in the work by means of the mechanism hereinbefore set forth. When the forward movement is completed, the lever 92 is shifted to its lowermost position, which throws the clutch-sleeve into engagement for the return movement and at the same time raises the pattern-carriage high enough for the tripping-fingers to escape contact with the punch mechanism as it moves back. On the back movement ratchet 67 and pawl 68 are thrown out of engagement, and pawl 73 and ratchet 74, on the opposite side of the machine, into engagement and reversing the motion of the sprockets and chains in transmitting the back movement to the pattern-carriage and at the same time continuing the forward movement of the feed-rolls in discharging the work from the machine before the forward movement is again initiated.

Having thus described my invention, what I claim, and desire to secure by Letters Patent, is—

1. In a machine of the class described, a number of continuously-revoluble shafts positioned at intervals, a series of punches operatively supported from said shafts, each punch having an independent action, means for imparting said independent action, and means for independently locking said punches in their normal position after the return from each down movement, substantially as set forth.

2. In a machine of the class described, a series of punches having independent action from each other and disposed in groups, the punches in each group being in line transversely but set diagonally with reference to the longitudinal dimensions of the machine, whereby a moving object may contact and actuate one or more punches in one group and avoid contact with one or more punches in the next group on the forward movement, substantially as set forth.

3. In a machine of the class described, a number of punch-carrying shafts arranged horizontally, a series of punches carried by said shafts, a traveling pattern provided with a number of tripping-fingers adapted to engage and impart a downward movement to said punches and duplicate the number and location of the perforations in the work in accordance with the number and location of the tripping-fingers in the pattern, substantially as set forth.

4. In a machine of the class described, a number of punch-carrying shafts, the cam-wheels loosely mounted thereon a yoke loosely surrounding each cam, the punch-stocks supported from each yoke, means for periodically locking the cams to rotate with the shafts and means for releasing the cams from their locked position at the proper time, substantially as set forth.

5. In a machine of the class described, a number of revoluble shafts, a series of punches mounted thereon in a working position and normally at rest but each having a reciprocating movement independent from that of the others, a traveling pattern and means carried thereby for contacting and initiating a downward movement of one or more punches on each forward movement of said pattern in accordance with the number of perforations to be made in the work, means for returning the punches to their normal position, and means for locking the same in a stationary position when so returned, substantially as set forth.

6. In a machine of the class described, a number of revoluble shafts arranged at intervals, a series of perforating-punches carried by said shafts and positioned in a straight line transversely but diagonally as to a longitudinal direction, a traveling pattern provided with a number of tripping-fingers, a dog interposed between said pattern and punches and locking the latter in their normal position and having one end extending into the path of said fingers to be tripped thereby in initiating a downward movement of such punches as are indicated by the number and position of the fingers in the pattern and means for returning the punches to their normal position, substantially as set forth.

7. In a machine of the class described, a number of revoluble shafts, the cam-wheels loosely mounted on each of the shafts, the eccentric yokes loosely surrounding the cam-wheels the punch-stocks carried by the yokes, the pawls pivoted to the cam-wheels, the ratchet-wheels rigidly mounted on said shafts and positioned to be engaged by the pawls in imparting a rotary movement to the cam-wheels, a traveling pattern indicating the number and position of the holes to be made in the work, and a dog pivotally mounted and free at both ends, one end being in position to operate the mechanism locking the cam-wheels against rotation and the other end in position to be tripped by the moving pattern in initiating a downward movement of the punches, substantially as set forth.

8. In a machine of the class described, the combination with a revoluble shaft, of a cam-wheel loosely mounted thereon, an eccentric yoke loosely surrounding the cam-wheels a punch-stock supported from the yoke, a ratchet-wheel loosely mounted on said shaft, a pawl pivoted to the cam-wheel and positioned to engage the ratchet-wheel, a finger holding the pawl in its disengaged position, means for throwing the pawl into engagement when the pressure of the finger is relaxed, and means for releasing the finger when the pawl is to engage the ratchet-wheel and rotate the cam-wheel in actuating the punch-stock, substantialy as set forth.

9. In a machine of the class described, a number of punch-carrying shafts, pinions mounted on the rear ends of said shafts, a counter-shaft running at right angles thereto the pinions mounted thereon and engaging the pinions on the punch-shafts in transmitting motion thereto, the companion clutch-pinions, the clutch-sleeve feathered in the counter-shaft and adapted to engage either of the clutch-pinions independently and means for manually throwing said sleeve into and out of engagement with said clutch-pinions in changing the direction of motion, substantially as set forth.

10. In a machine of the class described, the combination with a number of transverse rock-shafts each provided with a cam part, the punch-stocks carrying shifting-fingers positioned to depress the cam parts on the down movement and rock said shafts, a clutch-sleeve, a clutch shifting-rod, and the means interposed between the rock-shafts and shifting-rod in imparting a longitudinal movement to the latter and disengage the clutch-sleeve in momentarily stopping the feed mechanism during the time that the punches are in the work and means for automatically throwing the clutch-sleeve into engagement when the punches have cleared the work, substantially as set forth.

11. In a machine of the class described, the combination with a number of transverse rock-shafts provided with cam parts, the punch-stocks carrying shifting-fingers positioned to depress the cam parts on the down movement, a counter-shaft, companion clutch-pinions mounted thereon, a clutch-sleeve operatively mounted between the clutch-pinions and adapted to be moved into engagement with either one, a clutch shifting-rod having an endwise movement and engaging the clutch-sleeve, the means actuated by the down movement of the punch-stocks for imparting the endwise movement of said shifting-rod in disengaging the clutch-sleeve from the go-ahead pinion in momentarily stopping the forward movement of the punching-pattern and feed mechanism during the time that one or more punches are in the work, and means for automatically reëngaging the clutch-sleeve on the go-ahead side when the punches are freed from the work and the pressure on said cam parts relaxed, substantially as set forth.

12. In a machine of the class described, the combination with a number of transverse rock-shafts each provided with a cam part, of the standards secured to the rear ends of the rock-shafts, a clutch shifting-rod, the pins carried thereby and in position to be contacted by said standards in imparting an endwise movement to the shifting-rod, a counter-shaft, the companion clutch-pinions mounted on the counter-shaft and spaced apart, a clutch-sleeve located between said pinions on the counter-shaft and having both a rotary and a longitudinal movement thereon, and means for manually actuating said rock-shaft and transmitting an endwise movement to the clutch shifting-rod in controlling the position of the clutch-sleeve, substantially as set forth.

13. In a machine of the class described, a work-pattern properly supported in place, means for imparting a reciprocating movement to the same, a series of punches located underneath the path traveled by the pattern which is adapted to individually actuate such punches only as will reproduce the pattern in the work, substantially as set forth.

14. In a machine of the class described, a reciprocating carriage, a work-pattern a templet mounted thereon, a series of punches operatively supported in position and adapted to be actuated by the forward movement of the pattern the feed-shafts for moving the work through the machine, and means for momentarily arresting the motion of the pattern and feed-rolls during the time that the punches are in the work, substantially as set forth.

15. In a machine of the class described, a reciprocating carriage, a work-pattern mounted thereon, means for transmitting motion to said carriage, comprising revoluble shafts, a number of sprockets mounted on said shafts and the chain belts connecting said sprockets, substantially as set forth.

16. In a machine of the class described, a reciprocating carriage, a work-pattern having fingers projecting downward therefrom, a series of punches located underneath and in the path of the pattern and adapted to be actuated by the contact of said fingers on the forward movement and means for elevating the pattern in avoiding contact with the punches on the back movement, substantially as set forth.

17. In a machine of the class described, a reciprocating carriage, a work-pattern carried thereon, and means for elevating the carriage and pattern so that the latter may pass clear of an object on the return movement it came in contact with on the forward movement, substantially as set forth.

18. In a machine of the class described, a reciprocating carriage, a work-pattern mounted thereon, a crank-plate means for actuating the same, and the operative connection between said crank-plate and carriage whereby the latter is supported in elevated position for the return movement, substantially as set forth.

19. In a machine of the class described, the combination with companion upper and lower feed-shafts mounted in the front end of the machine, of the sprockets loosely mounted on the feed-shafts at opposite sides of the machine, the pawls pivoted to said sprockets, the ratchet-wheels rigidly mounted on said shafts and in position to be engaged by said pawls and the pattern-carriage, whereby a continuous forward movement is provided for in discharging the work after the pattern-carriage is reversed for the return movement, substantially as set forth.

20. In a machine of the class described, the combination with a transverse shaft 19 located in the front part of the machine, of means for transmitting motion thereto, an upper feed-shaft mounted in the front end of the machine, means for transmitting motion from shaft 19 to the feed-shaft, a sprocket loosely mounted thereon, a ratchet-wheel rigidly mounted on the feed-shaft, a pawl pivoted to said sprocket and engaging said ratchet, a lower feed-shaft receiving motion from the upper companion feed-shaft, a sprocket loosely mounted on the lower feed-shaft, a ratchet-wheel rigidly mounted thereon, a pawl pivoted to the last-mentioned sprocket and in engagement with the ratchet on the lower feed-shaft, substantially as set forth.

In testimony whereof I have signed my name to this specification in the presence of two subscribing witnesses.

HARRY L. ZEIGLER.

Witnesses:
L. B. COUPLAND,
J. B. DONALSON.